(12) United States Patent
Miller et al.

(10) Patent No.: US 7,453,997 B2
(45) Date of Patent: Nov. 18, 2008

(54) WIRELESS INTERNET SERVICES BILLING (75) Inventors: Quentin S. C. Miller, Sammamish, WA (US); John J. Ostlund, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 11/118,719

(22) Filed: Apr. 29, 2005

(65) Prior Publication Data

US 2006/0245562 A1 Nov. 2, 2006

(51) Int. Cl.
*H04M 15/00* (2006.01)
(52) U.S. Cl. .................................. 379/114.01; 379/115
(58) Field of Classification Search ................. 379/114, 379/115
See application file for complete search history.

(56) References Cited

U.S. PATENT DOCUMENTS

2003/0232615 A1* 12/2003 Kim et al. .................... 455/405

2006/0190351 A1* 8/2006 Dennis ........................ 705/26

* cited by examiner

*Primary Examiner*—Rasha S Al Aubaidi
(74) *Attorney, Agent, or Firm*—Lee & Hayes, PLLC (57) ABSTRACT

Wireless internet services billing enables a telecommunications company to bill internet service events on a transaction level. In a described implementation, an internet service event, which occurs at least partially within an internet environment, is detected. An internet services proxy injects event billing information related to the detached event into an event billing information communication that is sent to a telecommunications billing gateway. At the telecommunications billing gateway, the event billing information is logged into an event billing log in association with an identity of a telecommunications user. By way of example, the event billing information may comprise an action indicator and an entity identifier. The action indicator indicates an action corresponding to the event, and the entity identifier identifies an entity that is associated with the event. The internet services proxy may be located at a telecommunications device of a user, at a provider of internet services, or both.

16 Claims, 5 Drawing Sheets

WIRELESS INTERNET SERVICES BILLING

TECHNICAL FIELD

This disclosure relates in general to wireless internet services billing and in particular, by way of example but not limitation, to generating and/or disseminating wireless internet services billing information in a heterogeneous network environment.

BACKGROUND

Over approximately the last decade, the internet has matured to provide a number of services. For example, users can send and receive email, access databases, effectuate transactions, etc. via the internet. Mechanisms have arisen to enable financial accounting of these services.

Over approximately the last two decades, mobile networks have been created to provide their own set of services. For example, users of mobile networks can make and receive phone calls, send and receive text messages, and access the internet. Internet access via mobile networks is relatively limited despite the efforts of mobile network companies to link their mobile networks with the internet.

SUMMARY

Wireless internet services billing enables a telecommunications company to bill internet service events on a transaction level. In a described implementation, an internet service event, which occurs at least partially within an internet environment, is detected. In response to the detection, an internet services proxy injects event billing information that is related to the detected event into an event billing information communication that is sent to a telecommunications billing gateway. At the telecommunications billing gateway, the event billing information is logged into an event billing log in association with an identity of a telecommunications user.

By way of example, the event billing information may comprise an action indicator and an entity identifier. The action indicator indicates an action (e.g, an operation that is being performed) corresponding to the event. The entity identifier identifies an entity (e.g., an object such as related data) that is associated with the event. The internet services proxy may be located at a telecommunications device of a user, at a provider of internet services, both endpoints, or anywhere along a communication chain defined by these endpoints.

Other method, system, approach, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

As explained above, internet access via mobile networks is relatively limited despite the efforts of mobile network companies to link their mobile networks with the internet. One reason for the relatively limited access to the internet via mobile networks is that there are no provisions to account for occurrences of internet services in the context of mobile networks. Accordingly, there is a need for schemes, mechanisms, techniques, etc. that can enable mobile service companies to account for internet services that are accessed and/or experienced via mobile networks.

Today, there are significant barriers preventing mobile network operators (e.g., telcos) and mobile network service providers (e.g., merchants) from enabling internet services for consumers to be billed in a simple and flexible framework. Billing models in mobile networks are typically limited to either "network usage" based fees or "monthly service" based fees. Billing models that rely on network usage are dislike by users because usage metered in network minutes utilized or bytes transceived does not correlate well to the way users value the network service. Billing models that rely on fixed fees (with unlimited access during a given fixed period) do not bide well with network operators because networks, especially wireless networks, are inherently bandwidth limited. Consequently, at least from the perspective of network operators, there should be some level of price regulation associated with application costs and overall network usage. In other words, network operators generally want a nexus between a user's level of network consumption and the network access fees paid by the user.

A billing model that correlates application usage to fees billed bridges these two competing preferences. In other words, a billing model that can charge users for network usage on a basis and/or quantum they both appreciate and value without relying on an unlimited access fee structure can potentially meet at least the higher priorities of both users and network operators. With application transaction level billing from a network operator's perspective, network operators have more options and are more directly in control of billing. Application transaction level billing exposes a more granular billing system that associates application usage with billable events. With application transaction level billing from a user's perspective, users are able to directly correlate there application-level network usage (e.g., in terms of actions initiated and/or authorized) to billable events that can be indicated directly on their bills (e.g., in an itemized listing).

To accommodate their current billing systems, network operators wish to generate service usage events that are billable (which are typically referred to as billing events in telecommunications parlance). These billing events are processed to generate customer bills. In a described general implementation, application usage that occurs in an internet environment is communicated to the telecommunications network environment. For example, upon the occurrence of an event in the internet environment, event billing information is communicated to the telecommunications network environment. This event billing information may comprise an action corresponding to the event and/or an entity that is associated with the event.

In a described specific implementation, Web Service (WS)-* technology may be extended to support billing events by adding a WS-Billing section to a Simple Object Access Protocol (SOAP) header. This billing section of the header can be used to convey in a generic way the type of operation (the action) and the object that is being processed (the entity) by the web service method. For example, the billing section can communicate that an email of a defined type is being sent with (or without) an attachment. A telecommunications billing unit of a network operator, of a network service provider, or of another telecommunications company from a telecommunications network environment can use the billing information to generate telecommunications billing events.

General Example Implementations for Wireless Internet Services Billing

Figure 1:
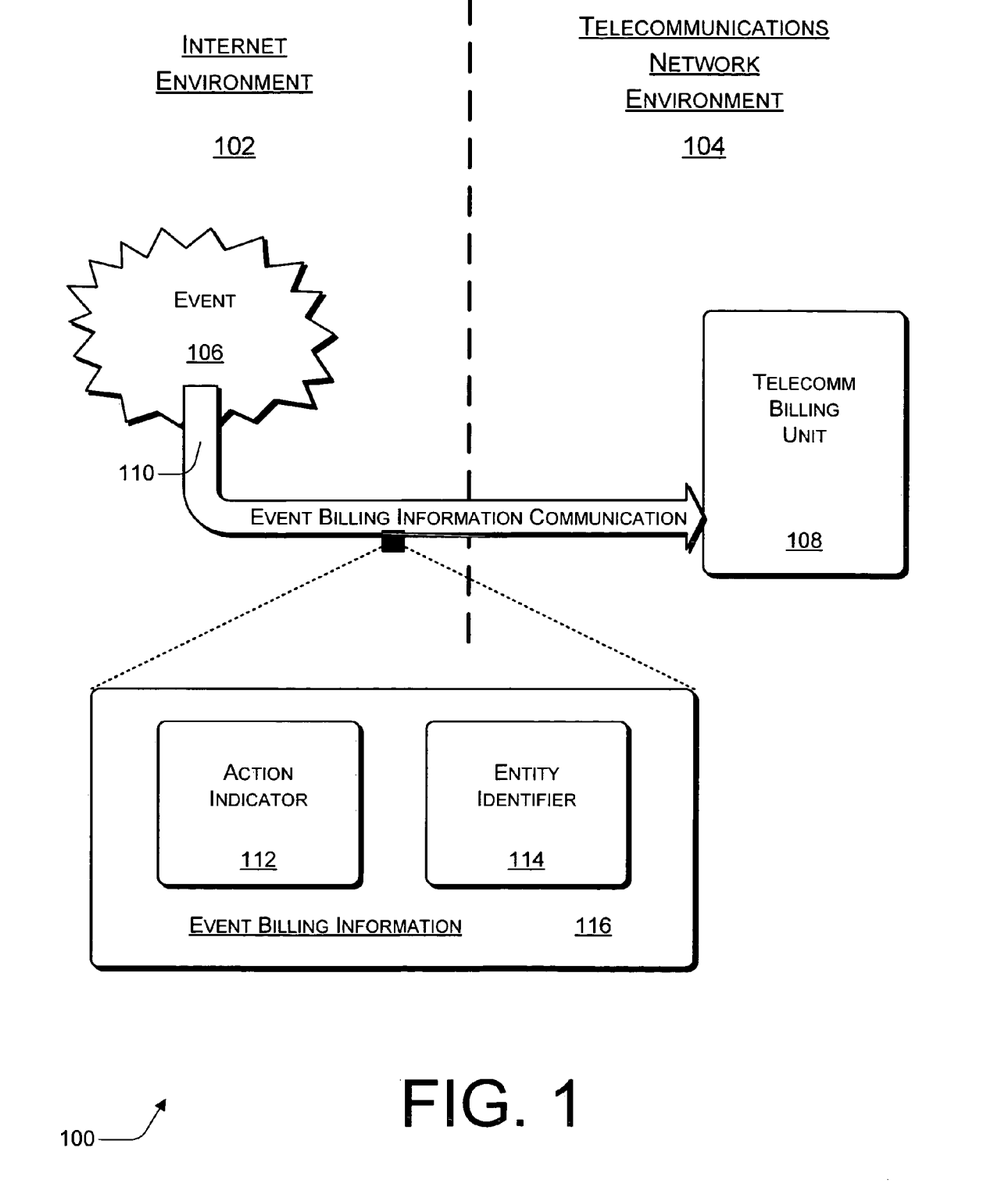
FIG. 1 is a block diagram of an example scheme for enabling telecommunications networks to account for internet service events.

FIG. 1 is a block diagram of an example scheme 100 for enabling telecommunications networks to account for internet service events. Scheme 100 is bifurcated into an internet environment 102 and a telecommunications network environment 104. Internet environment 102 may be comprised of one or more of a local area network (LAN), a wide area network (WAN), the traditional Internet, a Wi-Fi network, some combination thereof, and so forth. Telecomm network environment 104 may be comprised of one or more mobile or wireless networks, public switched telephone networks (PSTNs), some combination thereof, and so forth.

Within internet environment 102, an event 106 occurs or transpires. Generally, event billing information 116 that is related to event 106 is communicated to telecommunications billing unit 108 as event billing information communication 110. Event billing information communication 110 is effectuated as part of a transaction that is related or interrelated to event 106. Event 106 may or may not be considered a billable event by a telecommunications company. In fact, a telecommunications company may make the decision as to whether an event is billable on a case by case basis (e.g., based on an individual user's subscription plan).

Regardless, event billing information 116 may be collected for all events 106, for only those events known to be billable with respect to telecommunications billing unit 108, for those events that are specially stipulated by a telecommunications company, for those events that are defined by some other parameter(s), and so forth. Although FIG. 1 is oriented toward telecommunications billing unit 108 receiving event billing information 116 of event billing information communication 110, event billing information 116 may also be monitored and/or collected by internet-related companies.

In a described implementation, event billing information 116 includes an action indicator 112 that corresponds to event 106 and an entity identifier 114 that is associated with event 106. Action indicator 112 indicates the action corresponding to event 106. The action connotes some operation that is being performed (e.g., a task that is being accomplished or a goal that is being effectuated) with respect to the detected event. Entity identifier 114 identifies the entity that is associated with event 106. The entity denotes an object (e.g., a data type or other item that is the focus or target of the task or goal) that is related to the operation being performed with respect to the detected event.

Although a single action indicator 112 and entity identifier 114 are illustrated in FIG. 1, a given event billing information 116 communication 110 may actually include more than one action identifier 112 and/or more than one entity identifier 114. Examples of indicated actions 112 and identified entities 114 are described further herein below with particular reference to FIG. 4.

Figure 2:
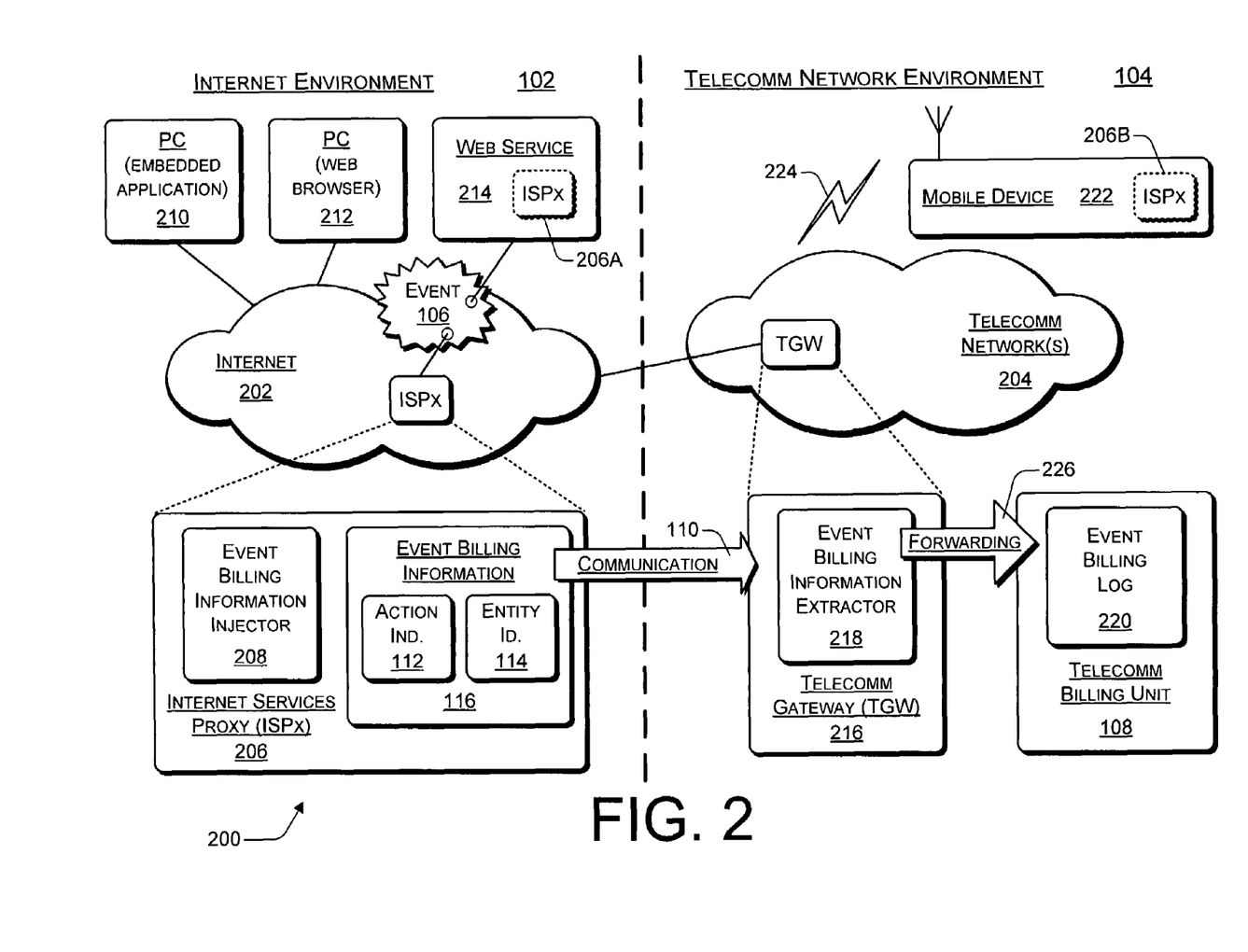
FIG. 2 is a block diagram of an example mechanism for communicating internet service event billing information to a telecommunications billing unit via an internet services proxy (ISPx).

FIG. 2 is a block diagram of an example mechanism 200 for communicating internet service event billing information 116 to a telecommunications billing unit 108 via an internet services proxy (ISPx) 206. As illustrated, mechanism 200 is bifurcated into internet environment 102 and telecommunications network environment 104. As described herein above with particular reference to FIG. 1, event billing information 116 is communicated 110 from internet environment 102 to telecommunications network environment 104. However, additional example details are shown in FIG. 2. For example, internet environment 102 is shown to include at least one internet 202, and telecommunications network environment 104 is shown to include one or more telecommunications networks 204.

In a described implementation, internet environment 102 includes an internet services proxy 206. Internet services proxy 206 includes an event billing information injector 208. Internet services proxy 206 includes, at least temporarily, event billing information 116 which comprises action indicator 112 and entity identifier 114.

Generally, multiple devices 210, 212, and 214 are coupled to (including being a part of) internet 202. Specifically, personal computers (PCs) 210 and 212 and web service 214 are coupled to internet 202. As illustrated, PC 210 is executing an embedded application that communicates via internet 202 using, e.g., a Transmission Control Protocol (TCP). PC 212 is executing a web browser that communicates via internet 202 using, e.g., a Hypertext Transfer Protocol (HTTP). Web service 214 may be realized as one or more server devices and is providing a web service via internet 202 using, e.g., a Web Services (WS) protocol (WS-*).

Web service 214 may be any one or more of many different types of web services, such as a web portal, an email provider, an internet service provider (ISP), a database offering remote access, some combination thereof, and so forth. Other examples of web services 214 include, but are not limited to: messaging, calendaring, social networking such as instant messaging, photo sharing, catalog shopping services, search and retrieval services, gaming services, commerce services, media metadata management services, group membership managing services, some combination thereof, and so forth. Although only three different devices and protocols are illustrated in FIG. 2 and described herein with regard to devices that are coupled to internet 202, many different alternative device types of various protocols and connection capabilities may be coupled to internet 202. Any such device type and/or service offering may be capable of participating in the occurrence of an event 106.

Telecommunications network environment 104 includes, in addition to telecommunications billing unit 108, a telecommunications gateway (GW) (TGW) 216 and a mobile device 222. Telecommunications GW 216 includes an event billing information extractor 218, and telecommunications billing unit 108 includes an event billing log 220. In a real-world implementation, telecommunications GW 216 and telecommunications billing unit 108 may be co-located and/or realized using the same device infrastructure. They may also be individually or jointly considered a billing GW for telecommunications network environment 104. As illustrated, telecommunications networks 204 include at least one wireless network that is capable of communicating with mobile device 222 via wireless connection 224.

Mobile device 222 typically comprises a mobile telephone or other hand-held wireless device. Nevertheless, mobile device 222 may alternatively comprise any device having a wireless communication capability. Although only one mobile device 222 is illustrated, there are typically many such mobile devices simultaneously communicating via telecommunications networks 204. Also, there may additionally be one or more non-mobile or fixed devices communicating via telecommunications networks 204.

Internet services proxy 206 is capable of detecting an event 106 that occurs at least partially in internet environment 102. Event billing information injector 208 of internet services proxy 206 is adapted to inject action indicator 112 and entity identifier 114 into event billing information communication 110 as event billing information 116. In this example, event billing information communication 110 is destined for telecommunications network 204. Accordingly, event billing information communication 110 is communicated to telecommunications network environment 104.

Telecommunications GW 216 acts as a gateway between telecommunications networks 204 and one or more other networks, such as internet 202 of internet environment 102. Telecommunications GW 216 is therefore capable of receiving event billing information communications 110 from internet services proxies 206. Upon receipt of each packet, telecommunications GW 216 can inspect it (e.g., inspect a header thereof) for the presence of event billing information 116.

Received packets may be part of a general communication exchange unrelated to an event that is even potentially billable or part of a communication exchange or transaction that is related to a (potentially or actually) billable event. If the latter, individual packets of the transaction may have event billing information 116 without any of the entity, both event billing information 116 and all or part of the entity, or the entity without any event billing information 116. Thus, telecommunications GW 216 may route, switch, or otherwise forward or handle packets of many different types and purposes without being limited to billing and/or event-related packets. When telecommunications GW 216 receives an event billing information communication 110, event billing information extractor 218 operates.

Event billing information extractor 218 is adapted to extract event billing information 116 from event billing information communication 110. The extracted event billing information 116 is forwarded to telecommunications billing unit 108. The original packets, if part of the event transaction, are also forwarded (e.g., to mobile device 222). Telecommunications billing unit 108 is capable of analyzing the forwarded event billing information 116, and telecommunications billing unit 108 is adapted to log relevant event billing information 116 into event billing log 220 in accordance with one or more parameters established by the telecommunications company.

Mechanism 200 is now described by way of an example operation. In this example, it is given that event 106 occurs on behalf of mobile device 222. Event 106 may occur fully or partially within internet environment 102 and partially within telecommunications network environment 104. Event 106 may be initiated by mobile device 222 or by a device (e.g., a PC 210 or 212 or a web service server device 214) that is coupled to internet 202. It is also given in this example that web service 214 is participating in a unidirectional or bidirectional communication with mobile device 222 that produces or at least results in event 106. Regardless, in a described implementation, event 106 occurs at least partially within internet 202.

Internet services proxy 206 detects the occurrence of event 106. The event types that are to be detected may be determined by a telecommunications company, by a company operating in internet environment 102, by the creator or user of internet services proxy 206, by the types of events that internet services proxy 206 is actually capable of detecting based on technology or location, some combination thereof, and so forth. In response to the event detection, an action corresponding to event 106 is determined, and an entity associated with event 106 is ascertained.

In this example, event billing information 116 is comprised of an indicator of the determined action and an identifier of the ascertained entity. Specifically, event billing information 116 comprises action indicator 112 and entity identifier 114. However, event billing information 116 may instead be comprised of one or more alternative descriptors of event 106 that are suitable for enumerating any desired billing-related parameter(s).

To create event billing information communication 110, event billing information injector 208 injects action indicator 112 and entity identifier 114 into event billing information 116. In a described implementation, event billing information communication 110 is comprised of one or more packets. These packets may originate at mobile device 222 or at web service 214 as an intrinsic part of the communication exchange between them. Alternatively, internet services proxy 206 may formulate such packets to create event billing information communication 110.

After injection of the billing-related descriptors of event 106, event billing information communication 110 is transmitted from internet services proxy 206 via internet 202 of internet environment 102 to telecommunications GW 216 via telecommunications network 204 of telecommunications network environment 104. Telecommunications GW 216 discerns or recognizes that (e.g, the packet(s) of) event billing information communication 110 includes event billing information 116. For example, telecommunications GW 216 may inspect at least one predetermined portion of incoming packets (e.g., a header) or all portions of incoming packets to recognize those incoming packets that include event billing information 116.

When an event billing information communication 110 having event billing information 116 is recognized, telecommunications GW 216 provides event billing information communication 110 to event billing information extractor 218. Event billing information extractor 218 operates to extract event billing information 116, including action indicator 112 and entity identifier 114, from event billing information communication 110. Telecommunications GW 216 forwards the extracted event billing information 116 to telecommunications billing unit 108. Alternatively, telecommunications GW 216 may forward the full packet(s) to telecommunications billing unit 108 for it to extract event billing information 116.

At telecommunications billing unit 108, the extracted and forwarded event billing information 116 is added to event billing log 220 in association with an identity of the user of mobile device 222. By way of example only, event billing information 116 may be inserted into one or more fields of a billing entry corresponding to the user's identity. The billing entry corresponding to the user's identity as well as other billing entries may be organized, for instance, in a comma delimited record (CDR) format in accordance with traditional telecommunications billing practices or in another alternative format.

To associate event billing information 116 with a user, telecommunications billing unit 108 is notified implicitly or explicitly of the identity of the user (e.g., by telecommunications GW 216). The identity can be included, for example, along with the forwarded event billing information 116 in the same or different packet(s). Knowledge of the user's identity is addressed further herein below with particular reference to FIGS. 3 and 4.

Internet services proxy 206 is illustrated generically as being coupled to internet 202. Internet services proxy 206 may actually be implemented in one or more of many possible locations. For example, internet services proxy 206 may be implemented anywhere along a communication chain that stretches between the source and destination, which is web service 214 and mobile device 222 (or vice versa) in the example operation described above, as long as internet services proxy 206 is capable of obtaining event billing information 116.

As illustrated in FIG. 2, an internet services proxy (ISPx) 206A can be located at web service 214, and/or an internet services proxy (ISPx) 206B can be located at mobile device 222. Although it is more likely that an internet services proxy 206 is located at either or both endpoints (e.g., at the source and/or at the destination) of a communication transaction, an internet services proxy 206 and the functions provided thereby may be located anywhere. Moreover, internet services proxy 206 may be distributed, including along the communication chain. Consequently, action indicator 112 and/or entity identifier 114 of event billing information 116 may be injected into an event billing information communication 110 anywhere between mobile device 222 and web service 214 (inclusive).

Mechanism 200 is now described by way of another example opreation. In this example, it is given that mobile device 222 initiates a transaction with web service 214. Although event billing information 116 may only be present in a limited number of the packets for the transaction, it is assumed in this example for the sake of clarity that heading field(s) for event billing information 116 are included in at least each initial packet of the transaction.

The transaction involves multiple participants, such as (the user of) mobile device 222, a telecommunications service provider, web service 214, and so forth. These participants might be identifiable from the source or destination of the packets. If not, or if additional identifying information is desirable, the identities of the transaction participants can be included as part of event billing information 116. An example of a header field for transaction participants is described further herein below with particular reference to FIG. 4; however, transaction participant identifications may be included in other packet portions.

When mobile device 222 initiates the web service transaction, an internet services proxy 206B located thereat may inject the known transaction participants. Possible examples include the user of mobile device 222, the name of the telecommunications service provider, and/or web service 214. If action indicator 112 and/or entity identifier 114 are known, these may also be injected upon transaction initiation. After formulating the initial packet(s), mobile device 222 transmits them to a telecommunications service provider (as represented by telecommunications GW 216) via telecommunications network 204.

At telecommunications GW 216, the telecommunications service provider may add any known transaction participant identities that were not previously included in the transaction packets. For example, there may be a customer number for the user of mobile device 222 that is unknown to mobile device 222, some specific designation for the telecommunications service provider (e.g., a carrier designation), and/or some partner code for the destination web service 214. Also, one or more of these three may not have been included at all by mobile device 222. The telecommunications service provider may also preliminarily or conditionally log the transaction while awaiting confirmation of the consummation of the transaction. The transaction packets are then forwarded from telecommunications GW 216 toward web service 214 via internet 202.

At web service 214, the portion of the web transaction that is to be effectuated by web service 214 is performed. An internet services proxy 206 that is located at web service 214 may also inject additional information into the transaction packets. The additional information may include, for example, action indicator 112; entity identifier 114; identities of known transaction participants (including its own) in the format of a name, code, partner identification, etc.; a transaction identification code or confirmation number; its customer number or other identifier for the user of mobile device 222; and so forth. The event billing information items that are injected by various different transaction participants may be injected into a single billing header, multiple billing headers (e.g., a header for each injecting participant), and so forth. Different participants may be permitted to overwrite previous event billing information items, or participants may be limited to adding items. The replacement privilege may be granted to certain transaction participants.

Of course, as part of the web service's performance of the requested transaction or event, web service 214 may include all or part of the entity, which is associated with the event and identified by entity identifier 114, in the transaction packets. The web service may also elect to log the transaction in an event billing log in association with an identity of the user of mobile device 222. By way of example only, event billing information 116 may be inserted into one or more fields of a billing entry corresponding to the user's identity. The transaction/event billing log maintained by the web service may be organized, for instance, in a format that enables, if not actually facilitates, periodic reconciliations with the event billing logs of telecommunications service providers (e.g., event billing log 220). The transaction packets are then sent back towards telecommunications GW 216 via internet 202.

At telecommunications GW 216, logic recognizes the existence of event billing information 116, which may possibly include transaction participants, special transaction or customer codes, a transaction consummation confirmation, etc., in addition to action indicator 112 and entity identifier 114. Event billing information extractor 218 extracts any or all of the contents of event billing information 116 from the transaction packets and forwards such contents to telecommunications billing unit 108 for appropriate logging. Alternatively, telecommunications GW 216 may forward a greater portion (including the entirety) of a transaction packet having event billing information 116 to telecommunications billing unit 108 for extraction.

The transaction packets are also forwarded onward to mobile device 222 via telecommunications network 204. The internet services proxy 206 at mobile device 222 may also log the internet transaction events at mobile device 222 to enable a user to track transactions, monitor expenses, double check a bill, and so forth. To this end, a telecommunications service provider and/or the web service may elect to inject the cost of the transaction event to facilitate a user's ability to keep a running total of transaction expenses for any given period. In an actual internet service transaction, there are probably multiple packet communication exchanges between mobile device 222 and web service 214 before the transaction is completed, including being completed for billing purposes.

The two major examples described above with reference to FIG. 2 provide specific possibilities with respect to communication flows, information injections, and so forth. However, many other possibilities may alternatively be implemented. For example, event billing information injection may be effectuated anywhere along the communication exchange path between the mobile device and the web service (inclusive). Transaction event logging may also occur anywhere along the communication exchange path. Thus, transaction event detection and billing information injection, extraction, and/or logging may occur at any endpoint, gateway, etc. along the communication exchange path.

Both event billing information injection and transaction event logging may be performed by other parties or participants beyond web service 214, the telecommunications service provider, and the user of mobile device 222. For example, a general internet services proxy (ISPx) that is located within telecommunications network 204 may perform either or both operations.

Figure 3:
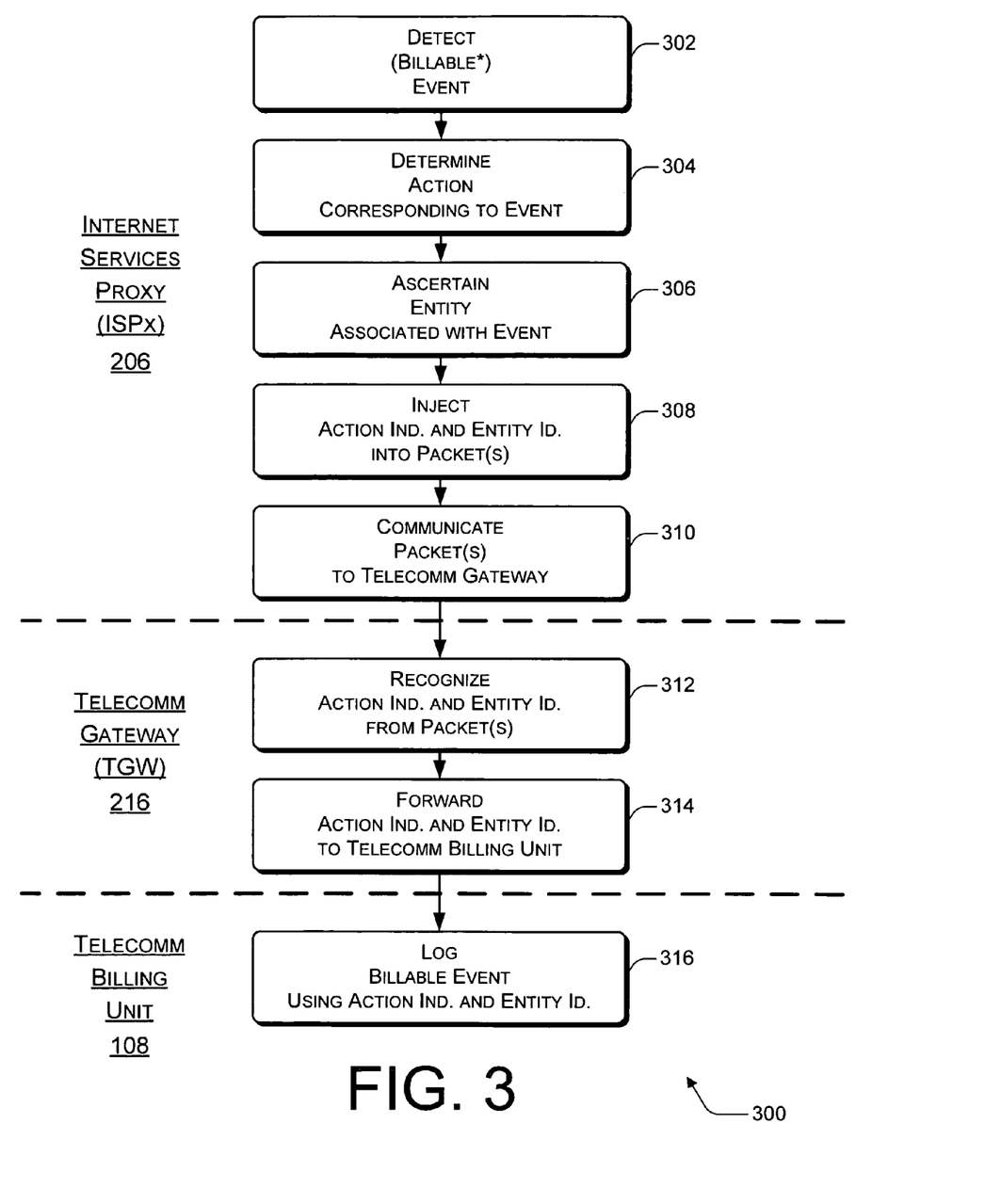
FIG. 3 is a flow diagram that illustrates an example of a method for communicating internet service billing information to a telecommunications billing unit via an internet services proxy.

FIG. 3 is a flow diagram 300 that illustrates an example of a method for communicating internet service billing information to a telecommunications billing unit via an internet services proxy. Flow diagram 300 includes eight (8) blocks 302-316. Although the actions of flow diagram 300 may be performed in other environments and with a variety of hardware and software combinations, FIGS. 1 and 2 are used in particular to illustrate certain aspects and examples of the method. By way of example only, the actions of blocks 302-310 may be performed by an internet services proxy 206, the actions of blocks 312-314 may be performed by a telecommunications GW 216, and the action(s) of block 316 may be performed by a telecommunications billing unit 108.

At block 302, a billable* event is detected. As indicated by the asterisk, the detected event may ultimately be categorized as non-billable by a telecommunications company. For example, an event 106 that occurs at least partially within an internet environment 102 may be detected by at least one internet services proxy 206 that is located along a chain stretching between a telecommunications device and a device providing the internet service.

At block 304, an action corresponding to the event is determined. At block 306, an entity associated with the event is ascertained. For example, an action corresponding to event 106 may be determined, and an entity associated with event 106 may be ascertained. The determination and ascertainment may be performed by the at least one internet services proxy 206.

At block 308, an action indicator and an entity identifier are injected into at least one packet. For example, an action indicator 112 and an entity identifier 114 may be injected into at least one packet. This packet may include none, part, or all of the ascertained entity. An example packet 402 is described further herein below with particular reference to FIG. 4.

At block 310, the packet is communicated to a telecommunications gateway. For example, the packet may be communicated from internet services proxy 206 to a telecommunications GW 216.

After the packet is received, at block 312 the action indicator and the entity identifier are recognized in the packet. For example, telecommunications GW 216 may recognize action indicator 112 and entity identifier 114 as being event billing information 116 within the packet. The packet may comprise an event billing information communication 110.

At block 314, the action indicator and the entity identifier are forwarded to a telecommunications billing unit. For example, telecommunications GW 216 may forward at least action indicator 112 and entity identifier 114, and optionally more of the packet, as event billing information 116 to a telecommunications billing unit 108.

After the event billing information is received, at block 316 the billable event is logged using the action indicator and the entity identifier. For example, telecommunications billing unit 108 may log action indicator 112 and entity identifier 114 in association with an identified user into an event billing log 220.

Proper transaction event logging into event billing log 220 entails identifying the user associated with the billable event. The identity of the user may be particular to an account or subscription of the user, a subscriber identity module (SIM) card, and/or the telecommunications device. Usually, the telecommunications company can intrinsically determine the identity of the user based on the source or destination of the packet(s) that carry event billing information 116. When this is not the case, the identity of the user may be affirmatively included in the packet(s) having event billing information 116. Alternatively, when a session is established having a context with an identified user, the user identity need not be included in the same packet(s) having event billing information 116 as long as the billing-related packet(s) may be determined to correspond to the session.

A user identity may comprise one or more of the following: a name, an account number, a telephone number, an email address, a network address, some combination thereof, and so forth. Within internet environment 102, user identities often comprise email addresses. Within telecommunications network environment 104, user identities often comprise telephone numbers. However, other combinations, additions, and substitutions are possible in both environments.

When event billing information 116 for internet services is provided to telecommunications companies, the reconciliation of billing records between telecommunications companies and internet-oriented companies can be facilitated. Reconciliation is performed between different companies to determine, after all of the transactions for a given time period are accounted for, which company owes which and how much based on contractual obligations. Furthermore, disbursement of bills may be delayed until after billing logs are synchronized.

Typically, for each billable event, telecommunications companies know the identity of the telecommunications company and the identity of the user. They can receive an action indicator 112 and an entity identifier 114 as described herein. Optionally, they may also be given the identity of the related internet service company.

Internet-oriented companies, on the other hand, typically know the identity of the internet service company and the identity of the user. In addition to logging the action indicator 112 and entity identifier 114, internet-oriented companies can benefit from knowing the identity of the telecommunications company of the user. By logging the identity of the telecommunications company for each internet service event, transaction event billing reconciliation with the various telecommunications companies is made easier and more accurate.

In order to log any of the different information described above, it may also be added to the packets (e.g., the headers of the packets) being communicated between the endpoints involved in the internet service transaction event. For example, an identity of the telecommunication company of the user may be injected into billing-related packets and/or other packets.

Logging internet service transaction events offers several enhancements and opportunities to telecommunications companies. As described above, telecommunications companies are empowered to bill for the consumption of their network resources in a manner and at a granularity that customers understand and are willing to accept. However, telecommunications companies can also log transaction events for tracking purposes, analysis of individual users' network consumption, cost/benefit analysis of different billing plans, etc. with or without ultimately billing these logged transaction events.

Additionally, the logging of internet service transaction events can enable telecommunications companies to ensure that there is a quality of service (QoS) aspect to proper transaction event billing. More specifically, the actual or final billing of a transaction event may be based on confirmation that the transaction is successfully completed. Billing of the user may be instituted only upon confirmation of delivery of the entity and/or completion of the transaction event.

By way of example, an internet service transaction event may be recorded in an event billing log 220 upon observation of an inbound/outbound packet that is initiating a transaction event. However, the transaction event is not finally logged at this point. Upon observation of a corresponding outbound/inbound packet that is concluding the transaction event, the billing event is checked off for final logging and subsequent billing. Whether packets have such a correspondence to a single transaction event may be determined using a session indication field, a "relates to" field, etc., depending on the transmission protocol employed. It should be understood that "initiating" and "concluding" as used above may not necessarily indicate an absolutely first or last packet due to negotiation, session establishment, authentication, and other communication-related tasks. Also, final logging may be made dependent on a special final confirmation received at telecommunications billing unit 108 from an internet services proxy 206 located at mobile device 222.

Figure 4:
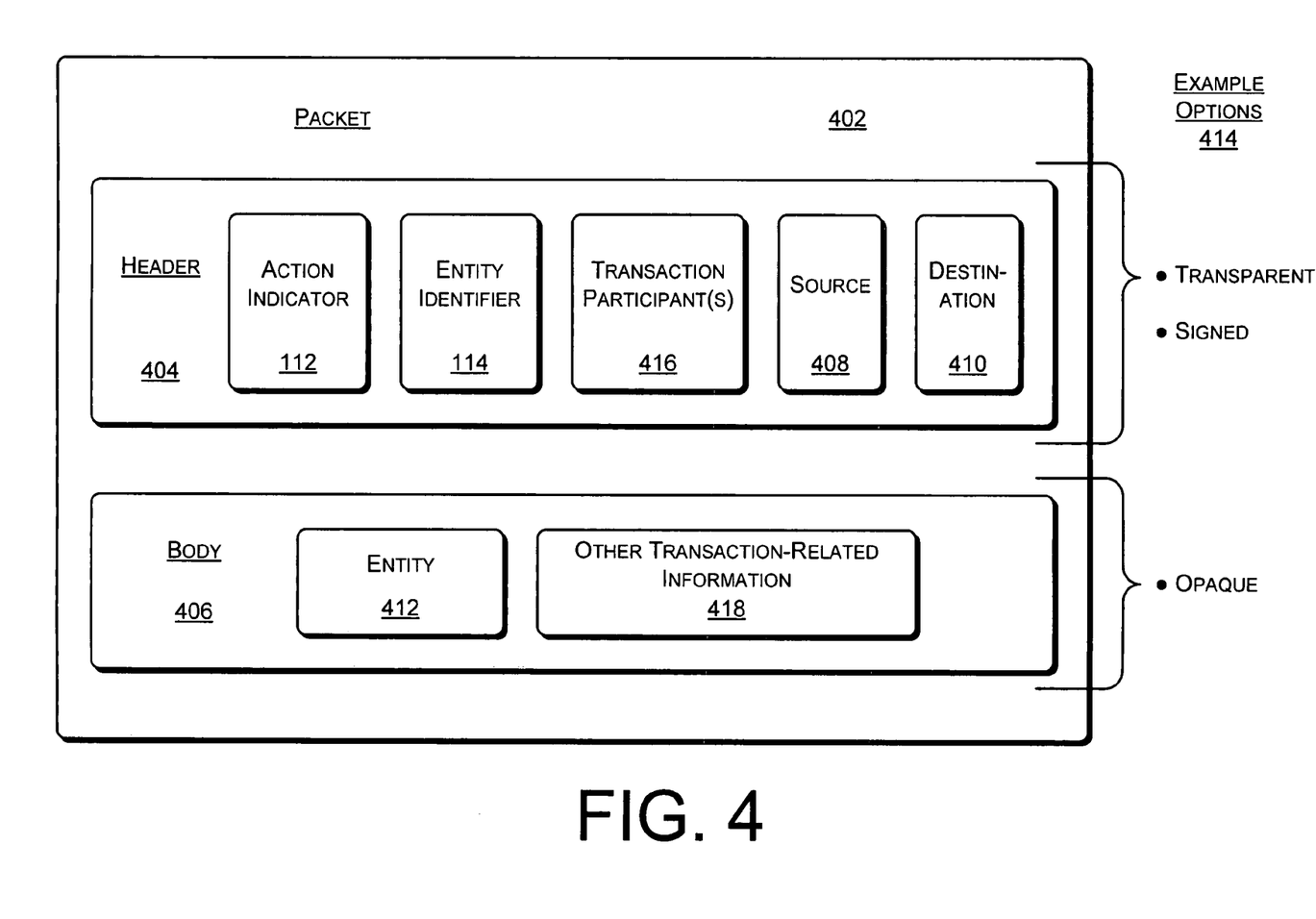
FIG. 4 is a block diagram of an example packet including action and entity information for a related internet service event.

FIG. 4 is a block diagram of an example communications packet 402 including action and entity information for a related internet service event. As illustrated, packet 402 includes at least one header 404 and a body 406. Generally, header 404 usually includes routing and other descriptive information of packet 402, and body 406 includes one or more payloads for packet 402.

Action indicator 112 and entity identifier 114 may be located anywhere within packet 402. However, in a described implementation, header 404 includes action indicator 112 and entity identifier 114. Entity identifier 114 identifies an entity 412. If any portion of entity 412 is present within packet 402, body 406 usually includes all or a portion of it as illustrated. Body 406 may also contain other information 418 that is related to the transaction event. Regardless, action indicator 112 and entity identifier 114 may be communicated in-band within a given transaction session along with the identified entity 412.

Header 404 also includes a source 408 and a destination 410. Source 408 holds or represents an address or other identifier of the originator of packet 402. Destination 410 holds or represents an address or other identifier of the intended recipient of packet 402. Thus, source 408 and destination 410 may be network addresses, email addresses, telephone numbers, some combination thereof, and so forth. When source 408 and/or destination 410 are inadequate to convey desired participant identifications, one or more participants to the transaction may be injected into another field: transaction participant(s) 416. As described above, one or more transaction participant fields 416 may be populated with identifiers of the web service, the telecommunications service provider, the user of the mobile device, and so forth.

By way of example, if mobile device 222 (of FIG. 2) originates a packet 402 and sends it to web service device 214, an identifier of mobile device 222 populates source 408, and an identifier of web service device 214 populates destination 410. In such an example, telecommunications GW 216 inspects header 404 searching for an action indicator 112 and/or an entity identifier 114. When discovered, they are stripped from header 404 and forwarded 226 to telecommunications billing unit 108. Alternatively, additional parts (including all of) packet 402 may be forwarded to telecommunications billing unit 108. Also, telecommunications GW 216 may inject an identifier of the associated telecommunications service provider into transaction participants 416 for subsequent extraction and logging by the web service of web service device 214.

Examples of actions that may be indicated by action indicator 112 include, but are not limited to, accessing a database, accessing scheduling information, sending/receiving an email, ordering a product/service, accessing information from a web site, networking socially and/or managing social networking data, performing a search, managing gaming data, accessing entertainment services, managing contact information, managing group membership data, managing and organizing media metadata, some combination thereof, and so forth. Examples of entity 412 that may be identified by entity identifier 114 include, but are not limited to, information from a database entry, calendar appointment information, an email attachment and/or body, invoice information, weather or news information, instant message data and/or social networking data, search results (e.g., URLs), gaming data, contact information, group membership data, media metadata, documents, media content, communication channels (e.g., voice, streaming video, etc.), other structured data, some combination thereof, and so forth.

Various example options 414 may be implemented with respect to packet 402. In one example implementation, all of packet 402 is transparent for access and understanding without applying a cipher or other cryptographic decoder. In another example implementation, all of packet 402 (except those portion(s) needed for routing) may be encrypted or an entire communication path may be set up to be encrypted (e.g., using a virtual private network (VPN)). In an illustrated example implementation, header 404 is transparent, but body 406 is opaque after application of an encryption mechanism. Generally, different portions of packet 402 may be encrypted or unencrypted in accordance with a desired security protocol.

Also, different portions of packet 402 may be signed to ensure authenticity. In another illustrated example implementation of options 414, at least action indicator 112 and entity identifier 114 are (e.g., digitally) signed to prevent unauthorized manipulation that might affect correct billing of internet service transaction events. If a signature of an action indicator 112 or entity identifier 114 cannot be verified, the transaction event related to packet 402 may not be billed, and packet 402 may even be diverted and undelivered.

Any of these example implementation options 414 may be combined in any manner. Additionally, header 404 may be considered to be comprised of multiple headers such that, for example, action indicator 112 and entity identifier 114 are part of one header, and source 408 and destination 410 are part of another header.

In operation with a packet such as example packet 402, header 404 informs a billing engine (e.g., of telecommunications GW 216 and/or telecommunications billing unit 108) of the contents of body 406. Continuing with the example described herein above with particular reference to FIG. 2, header 404 can originate at mobile device 222 or web service device 214. Regardless of the originating source, an internet services proxy 206 at mobile device 222, at web service device 214, or at another location along the communication chain can inject action indicator 112 and entity identifier 114 into header 404.

As described above, action indicator 112 and entity identifier 114 (or any other portion or portions of packet 402) may be signed individually or in groups. One transmission protocol that is capable of such partitioned signing of packets is the WS-*Security protocol. However, the schemes, mechanisms, techniques, etc. that are described generally herein may be implemented using other protocols. Examples of such other applicable protocols include, but are not limited to, Wireless Application Protocol (WAP), Internet Protocol (IP) (including IPv6), Hypertext Transfer Protocol (HTTP), Simple Object Access Protocol (SOAP), Session Initiation Protocol (SIP), Transmission Control Protocol (TCP), Lightweight Directory Access Protocol (LDAP), some combination thereof, and so forth.

Web Services (WS-*)-Technology-Oriented Message Example

Although other protocols may be employed, an example of a message format pertaining to WS-*Technology is described in this subsection. An example of an extensible message format is as follows:

As is apparent from the extensibility capability of this example, the billing metadata is extensible. For example, it may be extended to include identification of an original equipment manufacturer (OEM) of the mobile device, an application identifier and/or version that is functioning at the mobile device (or at the web service), and so forth.

The devices, actions, aspects, features, functions, procedures, modules, data structures, components, etc. of FIGS. 1-4 are illustrated in diagrams that are divided into multiple blocks. However, the order, interconnections, interrelationships, layout, etc. in which FIGS. 1-4 are described and/or shown is not intended to be construed as a limitation, and any number of the blocks can be modified, combined, rearranged, augmented, omitted, etc. in any manner to implement one or more systems, methods, devices, procedures, media, apparatuses, APIs, arrangements, etc. for wireless internet services billing. Furthermore, although the description herein includes references to specific implementations (including a general device of FIG. 5), the illustrated and/or described implementations can be implemented in any suitable hardware, software, firmware, or combination thereof and using any suitable transmission protocol(s), telecommunications billing gateway configuration(s), event billing information format(s), packet organization(s), internet services transac-

```
(001)  <S:Envelope xmlns:S="http://www.w3.org/2003/05/soap-envelope"
                   xmlns:wsb="http://schemas.xmlsoap.org/ws/2004/10/billing">
                   xmlns:op="http://schemas.fabrikam123.com/ws/2004/10/fabrikam123-billing">
(002)      <S:Header>
(003)          <wsa:MessageID>
(004)              uuid:6B29FC40-CA47-1067-B31D-00DD010662DA
(005)          </wsa:MessageID>
(006)          <wsa:ReplyTo>
(007)              <wsa:Address>http://business456.example/client1</wsa:Address>
(008)          </wsa:ReplyTo>
(009)          <wsa:To>http://fabrikam123.example/Purchasing</wsa:To>
(010)          <wsa:Action>http://fabrikam123.example/SubmitPO</wsa:Action>
(011)          <wsb:Billing>
(012)              <wsb:Entity>http://fabrikam123.com/PO</wsb:Entity>
(013)              <wsb:Action>http://fabrikam123.com/SubmitPO</wsb:Action>
(014)              <op:CustomerID>12345678</op:CustomerID>
(015)          </wsb:Billing>
(016)      </S:Header>
(017)      <S:Body>
(018)          ...
(019)      </S:Body>
(020)  </S:Envelope>
```

The example message format above comports with Simple Object Access Protocol (SOAP) 1.2. Lines (002) to (015) represent the example header of the SOAP message where the mechanisms described herein are used. The body is represented by lines (017) to (019). Lines (003) to (010) contain WS-Addressing data that may be used in the generation of billing events. Lines (011) to (015) contain the message billing header blocks. Specifically, line (012) specifies the entity being processed by the web service method, line (013) specifies the action for the web service method, and line (014) illustrates an extension that specifies the customer identity which can be used to relate the billing information to a user. It should be noted that the billing action is not necessarily the same as the WS-Addressing action. It should also be noted that a WS-Addressing From element can be used to relate the billing information to a user.

tion event definition(s), network types within the respective environment(s), and/or billable event logging approach(es), and so forth.

Example Operating Environment for Computer or Other Device

Figure 5:
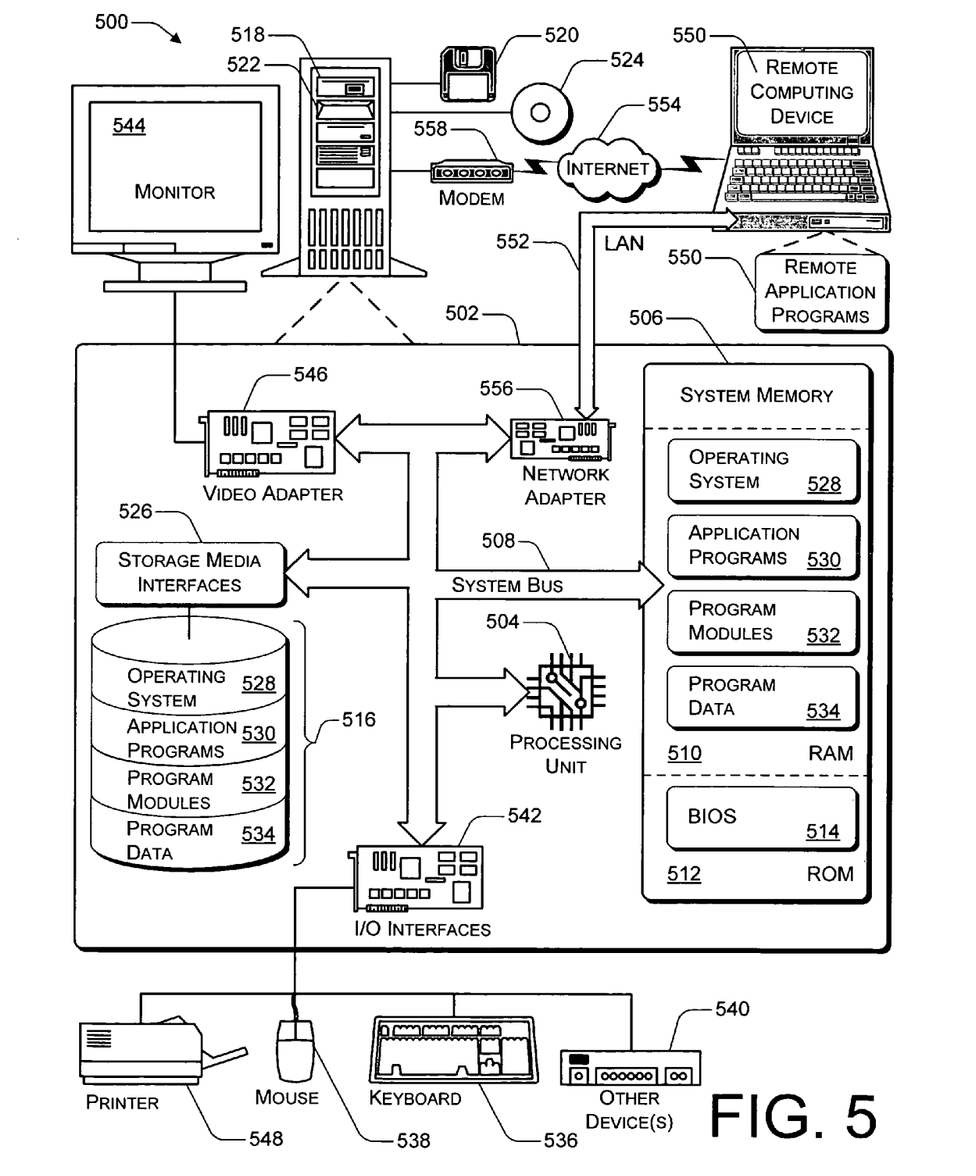
FIG. 5 illustrates an example of a computing (or general device) operating environment that is capable of (wholly or partially) implementing at least one aspect of wireless internet services billing as described herein.

FIG. 5 illustrates an example computing (or general device) operating environment 500 that is capable of (fully or partially) implementing at least one system, device, apparatus, component, arrangement, protocol, approach, method, procedure, media, application programming interface (API), some combination thereof, etc. for wireless internet services billing as described herein. Operating environment 500 may be utilized in the computer and network architectures described below.

Example operating environment 500 is only one example of an environment and is not intended to suggest any limitation as to the scope of use or functionality of the applicable device (including computer, network node, entertainment device, mobile appliance, general electronic device, etc.) architectures. Neither should operating environment 500 (or the devices thereof) be interpreted as having any dependency or requirement relating to any one or to any combination of components as illustrated in FIG. 5.

Additionally, implementations for wireless internet services billing may be realized with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for wireless internet services billing may be described in the general context of processor-executable instructions. Generally, processor-executable instructions include routines, programs, protocols, objects, functions, interfaces, components, data structures, etc. that perform and/or enable particular tasks and/or implement particular abstract data types. Realizations of wireless internet services billing, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 500 includes a general-purpose computing device in the form of a computer 502, which may comprise any (e.g., electronic) device with computing/processing capabilities. The components of computer 502 may include, but are not limited to, one or more processors or processing units 504, a system memory 506, and a system bus 508 that couples various system components including processor 504 to system memory 506.

Processors 504 are not limited by the materials from which they are formed or the processing mechanisms employed therein. For example, processors 504 may be comprised of semiconductor(s) and/or transistors (e.g., electronic integrated circuits (ICs)). In such a context, processor-executable instructions may be electronically-executable instructions. Alternatively, the mechanisms of or for processors 504, and thus of or for computer 502, may include, but are not limited to, quantum computing, optical computing, mechanical computing (e.g., using nanotechnology), and so forth.

System bus 508 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 502 typically includes a variety of processor-accessible media. Such media may be any available media that is accessible by computer 502 or another (e.g., electronic) device, and it includes both volatile and non-volatile media, removable and non-removable media, and storage and transmission media.

System memory 506 includes processor-accessible storage media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is typically stored in ROM 512. RAM 510 typically contains data and/or program modules/instructions that are immediately accessible to and/or being presently operated on by processing unit 504.

Computer 502 may also include other removable/non-removable and/or volatile/non-volatile storage media. By way of example, FIG. 5 illustrates a hard disk drive or disk drive array 516 for reading from and writing to a (typically) non-removable, non-volatile magnetic media (not separately shown); a magnetic disk drive 518 for reading from and writing to a (typically) removable, non-volatile magnetic disk 520 (e.g., a "floppy disk"); and an optical disk drive 522 for reading from and/or writing to a (typically) removable, non-volatile optical disk 524 such as a CD, DVD, or other optical media. Hard disk drive 516, magnetic disk drive 518, and optical disk drive 522 are each connected to system bus 508 by one or more storage media interfaces 526. Alternatively, hard disk drive 516, magnetic disk drive 518, and optical disk drive 522 may be connected to system bus 508 by one or more other separate or combined interfaces (not shown).

The disk drives and their associated processor-accessible media provide non-volatile storage of processor-executable instructions, such as data structures, program modules, and other data for computer 502. Although example computer 502 illustrates a hard disk 516, a removable magnetic disk 520, and a removable optical disk 524, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 500.

Any number of program modules (or other units or sets of processor-executable instructions) may be stored on hard disk 516, magnetic disk 520, optical disk 524, ROM 512, and/or RAM 510, including by way of general example, an operating system 528, one or more application programs 530, other program modules 532, and program data 534. These processor-executable instructions may include, for example, one or more of: event billing information 116 having action indicator 112 and entity identifier 114, an event billing information communication 110, an internet services proxy 206, coding for a telecommunications billing gateway, packet 402, some combination thereof, and so forth.

A user may enter commands and/or information into computer 502 via input devices such as a keyboard 536 and a pointing device 538 (e.g., a "mouse"). Other input devices 540 (not shown specifically) may include a microphone, joystick, game pad, satellite dish, serial port, video camera, scanner, and/or the like. These and other input devices are connected to processing unit 504 via input/output interfaces 542 that are coupled to system bus 508. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 544 or other type of display device may also be connected to system bus 508 via an interface, such as a video adapter 546. Video adapter 546 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 544, other output peripheral devices may include components such as speakers (not shown) and a printer 548, which may be connected to computer 502 via input/output interfaces 542.

Computer 502 may operate in a networked environment using logical connections to one or more remote computers, such as a remote computing device 550. By way of example, remote computing device 550 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 550 is illustrated as a portable computer that may include many or all of the elements and features described herein with respect to computer 502.

Logical connections between computer 502 and remote computer 550 are depicted as a local area network (LAN) 552 and a general wide area network (WAN) 554. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 502 is usually connected to LAN 552 via a network interface or adapter 556. When implemented in a WAN networking environment, computer 502 typically includes a modem 558 or other component for establishing communications over WAN 554. Modem 558, which may be internal or external to computer 502, may be connected to system bus 508 via input/output interfaces 542 or any other appropriate mechanism(s). It is to be appreciated that the illustrated network connections are examples and that other manners for establishing communication link(s) between computers 502 and 550 may be employed.

In a networked environment, such as that illustrated with operating environment 500, program modules or other instructions that are depicted relative. to computer 502, or portions thereof, may be fully or partially stored in a remote media storage device. By way of example, remote application programs 560 reside on a memory component of remote computer 550 but may be usable or otherwise accessible via computer 502. Also, for purposes of illustration, application programs 530 and other processor-executable instructions such as operating system 528 are illustrated herein as discrete blocks, but it is recognized that such programs, components, and other instructions reside at various times in different storage components of computing device 502 (and/or remote computing device 550) and are executed by processor(s) 504 of computer 502 (and/or those of remote computing device 550).

Although systems, media, devices, methods, procedures, apparatuses, techniques, schemes, approaches, procedures, arrangements, and other implications have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. One or more processor-accessible media comprising processor-executable instructions that include a communications packet; the communications packet capable of communicating event billing information, which is for an event that occurs at least partially in an internet environment, to a telecommunications network environment; the communications packet comprising:

an action indicator indicating at least one action that is performed with respect to the event, wherein the action indicator allows a user to directly correlate the event to the event billing information; and an entity identifier identifying at least one entity related to the action that is performed with respect to the event, wherein the at least one action that is performed with respect to the event comprises at least one of (i) accessing a database, (ii) accessing scheduling information, (iii) sending an email, (iv) ordering a product/service, or (v) accessing information from a web site; and wherein the at least one entity related to the action comprises at least one of (i) information from a database entry, (ii) calendar appointment information, (iii) an email attachment and/or body, (iv) invoice information, or (v) weather or news information.

2. The one or more processor-accessible media as recited in claim 1, wherein the communications packet further comprises:

a header portion;

wherein the header portion includes the action indicator and the entity identifier.

3. The one or more processor-accessible media as recited in claim 2, wherein the communications packet comports with a Web Services protocol format.

4. The one or more processor-accessible media as recited in claim 1, wherein the communications packet further comprises:

a source field indicating a source of the communications packet;

a destination field indicating a destination of the communications packet; and a transaction participants field identifying at least one participant to the event;

wherein at least one of the source or the destination of the communications packet comprises an identity of a user device operating within the telecommunications network environment.

5. The one or more processor-accessible media as recited in claim 1, wherein the one or more processor-accessible media comprise at least one of (i) one or more storage media or (ii) one or more transmission media.

6. The one or more processor-accessible media as recited in claim 1, wherein the communications packet further comprises:
  at least a part of the at least one entity as identified by the entity identifier;
  wherein the action indicator and the entity identifier are transparent, and the at least a part of the at least one entity is opaque.

7. The one or more processor-accessible media as recited in claim 1, wherein the communications packet is further capable of being transmitted from an internet services proxy, which is located at a telecommunications device or an internet services device, to a telecommunications billing gateway.

8. A device comprising:
  an internet services proxy that is capable of detecting an event that occurs at least partially in an internet environment; the internet services proxy adapted to inject, into one or more packets destined for a telecommunications network, event billing information comprised of an action indicator and an entity identifier; the action indicator indicating an action that is performed with respect to the detected event, and the entity identifier identifying an entity related to the action that is performed with respect to the detected event, wherein the action indicator allows a user to directly correlate the detected event to the event billing information; and
  wherein the action that is performed with respect to the detected event comprises at least one of (i) accessing a database, (ii) accessing scheduling information, (iii) sending an email, (iv) ordering a product/service, or (v) accessing information from a web site; and
  wherein the entity related to the action comprises at least one of (i) information from a database entry, (ii) calendar appointment information, (iii) an email attachment and/or body, (iv) invoice information, or (v) weather or news information.

9. The device as recited in claim 8, wherein the internet services proxy is further adapted to transmit the one or more packets toward a telecommunications billing gateway of the telecommunications network.

10. The device as recited in claim 8, wherein the device comprises a mobile device, and the telecommunications network comprises a mobile wireless network.

11. The device as recited in claim 8, wherein the device comprises at least one of a personal computer, a server computer, an internet router or switch, an internet gateway, or a mobile device.

12. A method comprising:
  detecting an internet service event that occurs at least partially within an internet environment;
  determining an action corresponding to the internet service event, wherein the determining includes allowing a user to directly correlate an action to the event billing information;
  ascertaining an entity associated with the internet service event;
  injecting an indicator of the action and an identifier of the entity into at least one packet;
  communicating the at least one packet toward a telecommunications gateway;
  receiving, at the telecommunications gateway, the at least one packet having the indicator of the action and the identifier of the entity;
  recognizing, at the telecommunications gateway, the indicator of the action and the identifier of the entity within the at least one packet;
  responsive to the recognizing, forwarding at least the indicator of the action and the identifier of the entity from the telecommunications gateway to a telecommunications billing unit;
  logging, by the telecommunications billing unit, the internet service event into a telecommunications event billing log using the indicator of the action and the identifier of the entity; and
  logging, by an internet service involved with the internet service event, the internet service event into an internet event billing log using the indicator of the action and the identifier of the entity.

13. The method as recited in claim 12, wherein the method is performed by one or more internet services proxies located at a telecommunications device and/or at an internet service device, and wherein the telecommunications device and the internet service device are involved in the internet service event.

14. The method as recited in claim 12, wherein the detecting comprises:
  detecting the internet service event; wherein the internet service event comprises at least one of a database access, an email transmission or reception, a scheduling information access, or a website information access.

15. The method as recited in claim 12, wherein the injecting comprises:
  injecting the identifier of the entity into a header of the at least one packet, wherein the entity comprises a data object that is related to the action;
  the method further comprising:
  encrypting the data object, at least a portion of the encrypted data object included within the at least one packet.

16. The method as recited in claim 12, further comprising:
  formulating the at least one packet; and
  digitally signing the indicator of the action and the identifier of the entity.

* * * * *